United States Patent
Kojima et al.

(10) Patent No.: US 8,434,876 B2
(45) Date of Patent: May 7, 2013

(54) PROJECTION TYPE DISPLAY APPARATUS HAVING A LIGHT SOURCE DEVICE WITH IMPROVED LIGHT UTILIZATION EFFICIENCY

(75) Inventors: Kuniko Kojima, Tokyo (JP); Hiroshi Kida, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 255 days.

(21) Appl. No.: 12/746,828

(22) PCT Filed: Oct. 21, 2009

(86) PCT No.: PCT/JP2009/005507
§ 371 (c)(1),
(2), (4) Date: Jun. 8, 2010

(87) PCT Pub. No.: WO2010/067504
PCT Pub. Date: Jun. 17, 2010

(65) Prior Publication Data
US 2011/0043763 A1 Feb. 24, 2011

(30) Foreign Application Priority Data

Dec. 8, 2008 (JP) ................................. 2008-311932
Jan. 22, 2009 (JP) ................................. 2009-011852

(51) Int. Cl.
*G03B 21/26* (2006.01)
(52) U.S. Cl.
USPC .......................................................... 353/94
(58) Field of Classification Search .................... 353/30, 353/94; 359/834, 629–633, 551; 362/560, 362/551, 234, 235, 227
See application file for complete search history.

(56) References Cited

U.S. PATENT DOCUMENTS

| | | | |
|---|---|---|---|
| 2004/0174500 A1* | 9/2004 | Ito | 353/20 |
| 2005/0146891 A1 | 7/2005 | Hatakeyama | |
| 2006/0244929 A1* | 11/2006 | Sawai et al. | 353/84 |
| 2007/0014124 A1* | 1/2007 | Gerets et al. | 362/560 |
| 2008/0259284 A1 | 10/2008 | Maeda et al. | |
| 2009/0009895 A1* | 1/2009 | Huang | 359/834 |
| 2009/0027631 A1* | 1/2009 | Liu et al. | 353/84 |
| 2010/0195059 A1* | 8/2010 | Wada | 353/37 |

FOREIGN PATENT DOCUMENTS

| | | |
|---|---|---|
| CN | 1703654 A | 11/2005 |
| CN | 201028331 Y | 2/2008 |
| CN | 201107538 Y | 8/2008 |

(Continued)

*Primary Examiner* — Thanh Luu
*Assistant Examiner* — Danell L Owens
(74) *Attorney, Agent, or Firm* — Birch, Stewart, Kolasch & Birch, LLP

(57) ABSTRACT

A projection type display apparatus having a long-life light source device with high light utilization efficiency includes first and second light source lamps; a light intensity equalizing element; first and second bending mirrors; an image display element modulating a light flux emitted from the light intensity equalizing element and converting it into image light; and a projection optical system projecting the image light on a screen; and the first light source lamp, the second light source lamp, the first bending mirror and the second bending mirror are arranged so that a first optical axis of the first light source lamp disagrees with a second optical axis of the second light source lamp and a first distance between the first bending mirror and an incidence end differs from a second distance between the second bending mirror and the incidence end.

10 Claims, 11 Drawing Sheets

FOREIGN PATENT DOCUMENTS

| | | |
|---|---|---|
| JP | 2000-75407 A | 3/2000 |
| JP | 2001-21996 A | 1/2001 |
| JP | 2001-215613 A | 8/2001 |
| JP | 2001-359025 A | 12/2001 |
| JP | 3408202 B2 | 3/2003 |
| JP | 3448223 B2 | 7/2003 |
| JP | 2005-115094 A | 4/2005 |
| JP | 2006-78949 A | 3/2006 |
| JP | 2006-162689 A | 6/2006 |
| JP | 2006-308778 A | 11/2006 |
| JP | 2007-027122 A | 2/2007 |
| JP | 4120628 B2 | 5/2008 |

* cited by examiner

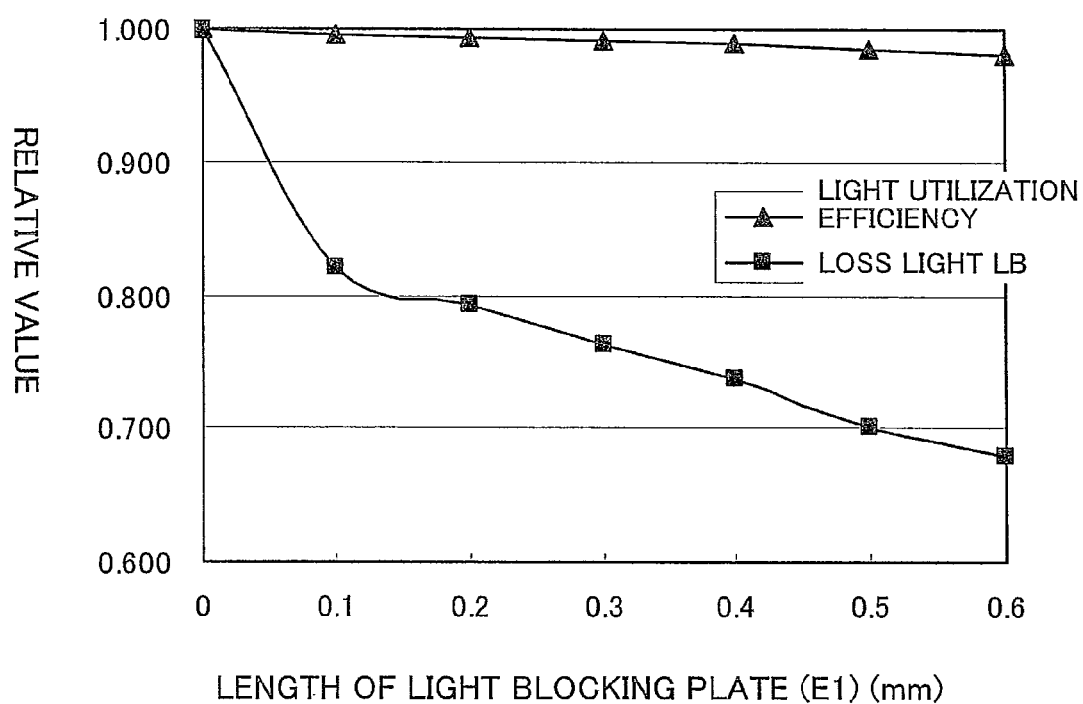

PROJECTION TYPE DISPLAY APPARATUS HAVING A LIGHT SOURCE DEVICE WITH IMPROVED LIGHT UTILIZATION EFFICIENCY

This application is a National Stage Entry of PCT/JP2009/005507 filed on Oct. 21, 2009, which is incorporated herein by reference in its entirety.

TECHNICAL FIELD

The present invention relates to a projection type display apparatus using a plurality of light source lamps.

BACKGROUND ART

In order to realize large-sized images with high luminance displayed by a projection type display apparatus, a projection type display apparatus having a multi-lamp light source device including a plurality of light source lamps is proposed. For example, Patent Document 1 (Japanese Patent Application Kokai Publication No. 2001-359025, paragraphs 0013 to 0018 and FIG. 1) proposes a light source device for a projection type display apparatus, in which light fluxes from two light source lamps disposed facing each other are combined through the use of a prism disposed near light converging points of the light source lamps.

Patent Document 1 is Japanese Patent Application Kokai Publication No. 2001-359025.

DISCLOSURE OF THE INVENTION

Problems to be Solved by the Invention

However, in the apparatus described in Patent Document 1, the two light source lamps are disposed facing each other with a prism therebetween, and accordingly, in loss light from one of the light source lamps, proportion of light which reaches a light emitter in the other facing light source lamp increases. Thus, there are problems that light utilization efficiency is lowered and that life of the light source lamp is shortened by a rise in temperature of the light source lamp accompanied by the incident loss light.

Therefore, the present invention is made to solve the problems of the above-mentioned conventional art, and an object of the present invention is to provide a projection type display apparatus having a long-life light source device with high light utilization efficiency.

Means of Solving the Problem

According to an aspect of the present invention, the projection type display apparatus includes: a first light source unit emitting a first light flux; a second light source unit being disposed so as to approximately confronting the first light source unit and emitting a second light flux; a light intensity equalizing unit including an incidence end and an exit end and converting a light flux incident to the incidence end into a light flux with an equalized intensity distribution, which is emitted from the exit end; a first bending unit directing the first light flux emitted from the first light source unit toward the incidence end; a second bending unit directing the second light flux emitted from the second light source unit toward the incidence end; an image display element modulating the light flux emitted from the exit end of the light intensity equalizing unit to convert the light flux into image light; and a projection optical system projecting the image light on a screen; wherein the first light source unit, the second light source unit, the first bending unit and the second bending unit are arranged so that a first optical axis of the first light source unit disagrees with a second optical axis of the second light source unit and a first distance between the first bending unit and the incidence end differs from a second distance between the second bending unit and the incidence end.

Effects of the Invention

In an aspect of the present invention, since each element is arranged so that a first optical axis of the first light source unit disagrees with a second optical axis of the second light source unit and a first distance between the first bending unit and the incidence end differs from a second distance between the second bending unit and the incidence end, loss light traveling from the first light source unit toward the second light source unit and loss light traveling from the second light source unit toward the first light source unit can be reduced, and therefore light utilization efficiency can be improved. Furthermore, according to the present invention, since influence of the loss light decreases, there is an effect that lives of the first light source unit and the second light source unit can be made longer.

BRIEF DESCRIPTION OF THE DRAWINGS

FIG. 14 is a diagram showing a relationship between a length of a light blocking plate and light utilization efficiency, and a relationship between a length of the light blocking plate and loss light.

BEST MODE FOR CARRYING OUT THE INVENTION

First Embodiment

Figure 1:
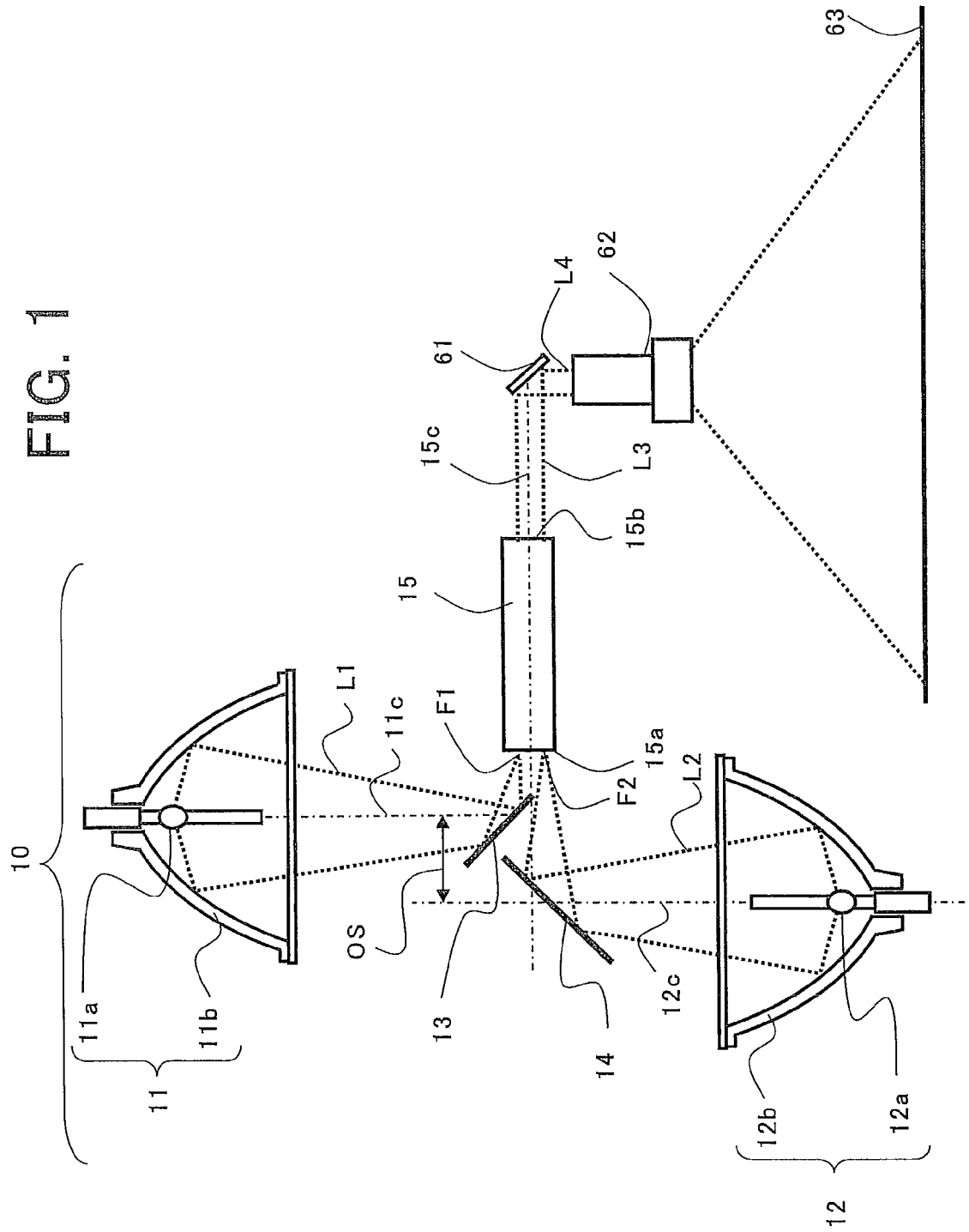
FIG. 1 is a diagram schematically showing a structure of a projection type display apparatus according to a first embodiment of the present invention.

FIG. 1 is a diagram schematically showing a structure of a projection type display apparatus according to a first embodiment of the present invention. As shown in FIG. 1, the projection type display apparatus according to the first embodiment includes a light source device 10 which emits a light flux with equalized intensity; an image display element (light valve) 61 which modulates a light flux L3 emitted from the light source device 10 depending on an input image signal, thereby converting it into image light L4; and a projection optical system 62 which enlarges and projects the image light L4 on a screen 63. Although the reflection-type image display element 61 is shown in FIG. 1, the image display element 61 can be a transmission-type image display element. The image display element 61 is, for example, a liquid crystal light valve, a digital micromirror device (DMD) or the like. In the case of a rear-projection-type projection type display apparatus, the screen 63 is a part of the projection type display apparatus. Furthermore, the arrangement of the light source device 10, the image display element 61, the projection optical system 62 and the screen 63 is not limited to the example shown in the drawing.

The light source device 10 includes a first light source lamp 11 as a first light source unit, which emits a first light flux L1; a second light source lamp 12 as a second light source unit, which is disposed so as to approximately confronting the first light source lamp 11 and emits a second light flux L2; a light intensity equalizing element 15 as a light intensity equalizing unit, which converts an incident light flux at an incidence end 15a into a light flux with an equalized intensity distribution and emits the converted light flux from an exit end 15b; a first bending mirror 13 as a first bending unit, which directs the first light flux L1 emitted from the first light source lamp 11, toward the incidence end 15a; and a second bending mirror 14 as a second bending unit, which directs the second light flux L2 emitted from the second light source lamp 12, toward the incidence end 15a.

In the first embodiment, the first light flux L1 emitted from the first light source lamp 11 and the second light flux L2 emitted from the second light source lamp 12 are converging light fluxes. The first light source lamp 11, the second light source lamp 12, the first bending mirror 13, the second bending mirror 14 and the light intensity equalizing element 15 are arranged so that a first optical axis 11c of the first light source lamp 11 disagrees with a second optical axis 12c of the second light source lamp 12 and a first distance between the first bending mirror 13 and the incidence end 15a differs from a second distance between the second bending mirror 14 and the incidence end 15a (with a difference of offset amount OS, which will be described below). FIG. 1 shows a case that the first distance between the first bending mirror 13 and the incidence end 15a is shorter than the second distance between the second bending mirror 14 and the incidence end 15a. Furthermore, FIG. 1 shows a case that the first light source lamp 11, the second light source lamp 12, the first bending mirror 13, the second bending mirror 14 and the light intensity equalizing element 15 are arranged so that an angle between the first optical axis 11c of the first light source lamp 11 and an optical axis 15c of the light intensity equalizing element 15 is 90 degrees, and an angle between the second optical axis 12c of the second light source lamp 12 and the optical axis 15c of the light intensity equalizing unit 15 is 90 degrees.

The first light source lamp 11 includes, for example, an illuminant 11a which emits white light and an ellipsoidal mirror 11b which is disposed around the illuminant 11a. The ellipsoidal mirror 11b reflects a light flux emitted from a first focal point corresponding to a first center of ellipse and converges it on a second focal point corresponding to a second center of ellipse. The illuminant 11a is disposed near the first focal point of the ellipsoidal mirror 11b and a light flux emitted from the illuminant 11a converges near the second focal point of the ellipsoidal mirror 11b. Further, the second light source lamp 12 includes, for example, an illuminant 12a which emits white light and an ellipsoidal mirror 12b which is disposed around the illuminant 12a. The ellipsoidal mirror 12b reflects a light flux emitted from a first focal point corresponding to a first center of ellipse and converges it on a second focal point corresponding to a second center of ellipse. The illuminant 12a is disposed near the first focal point of the ellipsoidal mirror 12b and a light flux emitted from the illuminant 12a converges near the second focal point of the ellipsoidal mirror 12b. Furthermore, parabolic mirrors can be used as a substitute for the ellipsoidal mirrors 11b and 12b. In this case, it is effective to parallelize substantially light fluxes emitted from the illuminants 11a and 12a by the parabolic mirrors and then to converge by a condenser lens (not shown in the drawing). Moreover, concave mirrors which are not parabolic mirrors can also be used as a substitute for the ellipsoidal mirrors 11b and 12b. Furthermore, three or more light source lamps can be disposed.

Further, in the projection type display apparatus according to the first embodiment, the first light source lamp 11, the second light source lamp 12, the first bending mirror 13, the second bending mirror 14 and the light intensity equalizing element 15 are arranged so that a first light converging point F1 of the first light flux L1 is positioned closer to the light intensity equalizing element 15 in comparison with the first bending mirror 13, and a second light converging point F2 of the second light flux L2 is positioned closer to the light intensity equalizing element 15 in comparison with the second bending mirror 14. The first light flux L1 collected by the ellipsoidal mirror 11b is converged to a position near the incidence end 15a of the light intensity equalizing element 15, by the first bending mirror 13. The second light flux L2 collected by the ellipsoidal mirror 12b is converged to a position near the incidence end 15a of the light intensity equalizing element 15, by the second bending mirror 14. Furthermore, in the projection type display apparatus according to the first embodiment, a first incident position where a central ray of the first light flux L1 (parallel to the optical axis 15c in the first embodiment) enters at the incidence end 15a, differs from a second incident position where a central ray of the second light flux L2 (parallel to the optical axis 15c in the first embodiment) enters at the incidence end 15a, and the first and second incident positions are distant from the optical axis 15c of the light intensity equalizing element 15 (positioned at distances of off-center amount d1, d2, which will be described below).

The light intensity equalizing element 15 has a function of equalizing light intensity (that is, reducing illumination irregularities) of the first light flux L1 guided by the first bending mirror 13 and the second light flux L2 guided by the second bending mirror 14, in cross sections of the light fluxes (that is, in a plane which is orthogonal to the optical axis 15c of the light intensity equalizing element 15). In general, the light intensity equalizing element 15 is a polygonal pillar-shaped rod (that is, a pillar-shaped element whose cross section is polygonal in shape) which is made by transparent material such as glass, resin or the like and is structured so that inside of side walls is entirely a reflection surface, or the light intensity equalizing element 15 is a pipe (pipe-shaped element) which is assembled into a tube shape with a light reflection surface inside and whose cross section is polygonal in shape. If the light intensity equalizing element 15 is a polygonal-pillar rod, light is reflected several times according to total internal reflection function at an interface between the transparent material and air, and then the light is exited from an exit end. If the light intensity equalizing element 15 is a polygonal pipe, light is reflected several times according to reflection function by a surface mirror facing inward, and then the light is exited from an exit end (exit opening). If the light intensity equalizing element 15 has an appropriate length in a light-flux travelling direction, light which has been internally reflected several times is irradiated in a superposition manner near the exit end 15b of the light intensity equalizing element 15, and substantially-equalized intensity distribution can be obtained near the exit end 15b of the light intensity equalizing element 15.

Figure 2A:
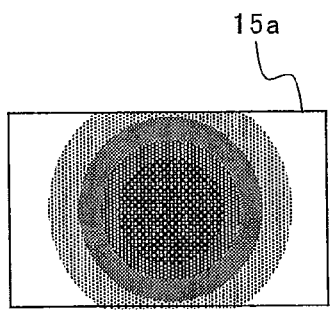
FIG. 2A is a diagram schematically showing distribution of a light flux at an incidence end of a light intensity equalizing element in a comparative example.
Figure 2B:
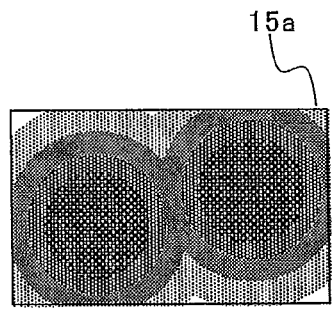
FIG. 2B is a diagram schematically showing distribution of a light flux at an incidence end of a light intensity equalizing element in the first embodiment.
Figure 2C:
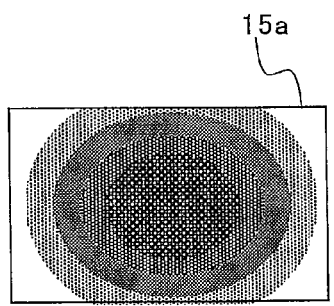
FIG. 2C is a diagram schematically showing another example of distribution of the light flux at the incidence end of the light intensity equalizing element in the first embodiment.

FIG. 2A to FIG. 2C are explanatory diagrams schematically showing distribution of light fluxes at the incidence end 15a of the light intensity equalizing element 15. In FIG. 2A to FIG. 2C, a dense-colored (nearly black) portion is an area where a light flux is strong (bright), and the light flux is weaker (darker) where color is thinner (closer to white). FIG. 2A shows an example of distribution of a light flux at the incidence end of the light intensity equalizing element, in a case of a comparative example that a single light source lamp is used. FIG. 2A shows the distribution that light intensity peaks near a center of the incidence end 15a and gradually darkens toward periphery. On the other hand, FIG. 2B and FIG. 2C show examples of distribution of light fluxes at the incidence end 15a of the light intensity equalizing element 15, in a case of the present invention that two light source lamps are used. FIG. 2B shows the example that, at the incidence end 15a of the light intensity equalizing element 15, a light irradiation area by the first light source lamp 11 and a light irradiation area by the second light source lamp 12 hardly overlap at the incidence end 15a. FIG. 2C shows the other example that, at the incidence end 15a of the light intensity equalizing element 15, the light irradiation area by the first light source lamp 11 and the light irradiation area by the second light source lamp 12 mostly overlap at the incidence end 15a, a direction of the central ray of the first light flux L1 is inclined with respect to the optical axis 15c, and a direction of the central ray of the second light flux L2 is inclined with respect to both of the direction of the central ray of the first light flux L1 and the optical axis 15c.

Figure 3:
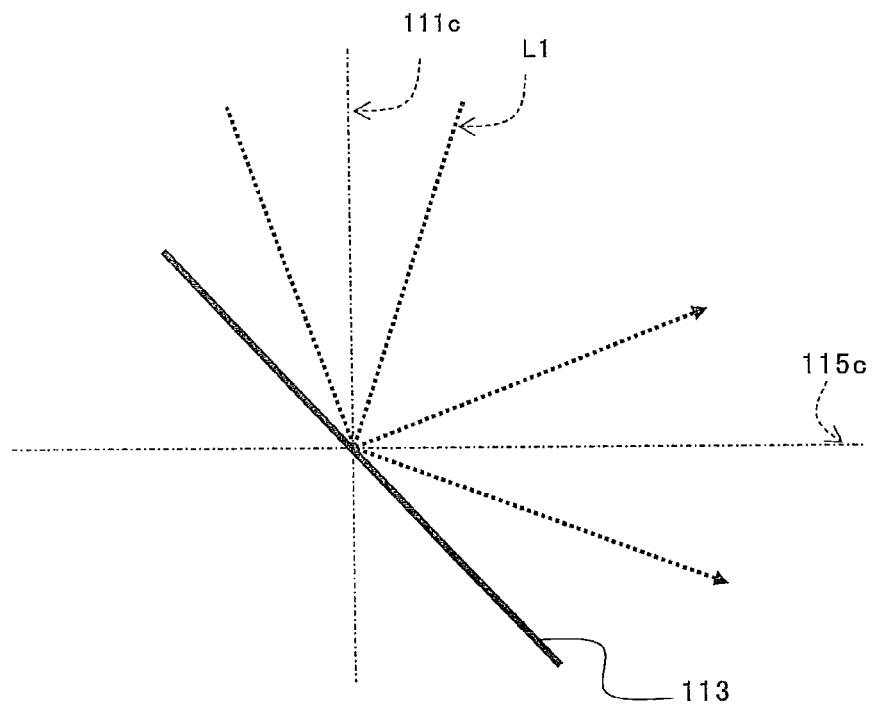
FIG. 3 is a diagram schematically showing an arrangement of a bending mirror in the comparative example.

FIG. 3 is a diagram schematically showing an arrangement of a bending mirror in the comparative example. FIG. 3 shows a structure that a single light source lamp is disposed, an optical axis 111c of the light source lamp is at a right angle with an optical axis 115c of a light intensity equalizing element 115, and a central ray of a light flux L1 which is reflected by the bending mirror 113 agrees with the optical axis 115c of the light intensity equalizing element. In the comparative example shown in FIG. 3, the bending mirror 113 which has a sufficiently large reflection surface can be obtained, and thereby the light flux L1 from the light source lamp can be bended with little loss.

Figure 4:
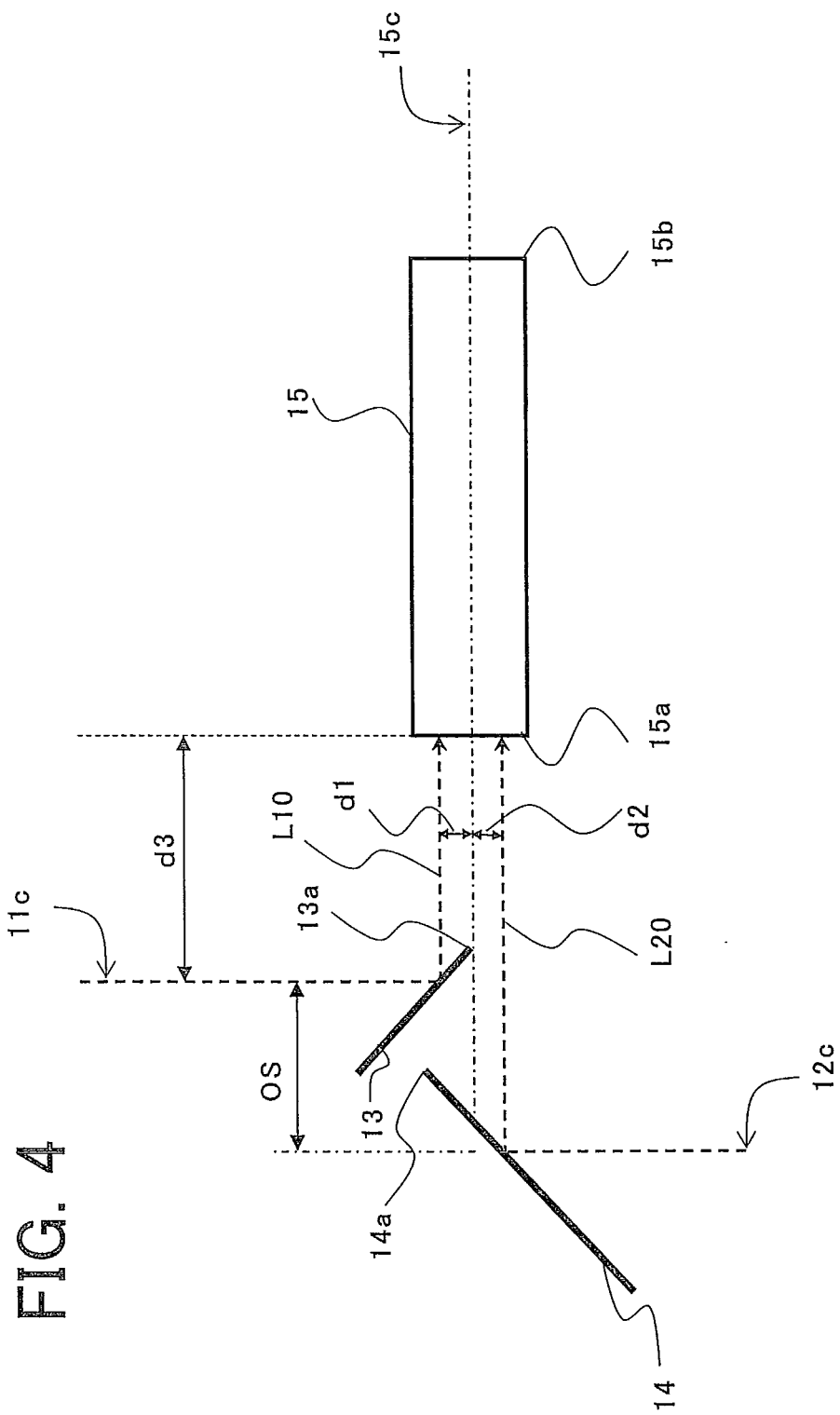
FIG. 4 is a diagram showing a structure of a principal part of the projection type display apparatus according to the first embodiment.

FIG. 4 is a diagram showing a structure of a principal part of the projection type display apparatus according to the first embodiment. FIG. 4 shows the first bending mirror 13, the second bending mirror 14, and the light intensity equalizing element 15. As shown in FIG. 4, in the first embodiment, the elements are arranged so that the second focal point of the ellipsoidal mirror 11b of the first light source lamp 11 and the second focal point of the ellipsoidal mirror 12b of the second light source lamp 12 are positioned near the incidence end 15a of the light intensity equalizing element 15. Furthermore, it is structured so that the first optical axis 11c of the first light source lamp 11 disagrees with the second optical axis 12c of the second light source lamp 12 and a value (offset amount OS) of an interval between the first optical axis 11c and the second optical axis 12c is larger than 0.

In a case that the first light flux L1 from the first light source lamp 11 enters at the incidence end 15a of the light intensity equalizing element 15 by the first bending mirror 13, and at the same time, the second light flux L2 from the second light source lamp 12 enters at the incidence end 15a of the light intensity equalizing element 15 by the second bending mirror 14, the first bending mirror 13 cannot have an enough size so as not to block the second light flux L2. For this reason, in the structure shown in FIG. 4, the first light flux L1 and the second light flux L2 are inevitably lost in some degree.

Suppose a central ray L10 of the first light flux L1 which is bended by the first bending mirror 13 and a central ray L20 of the second light flux L2 which is bended by the second bending mirror 14 are caused to agree with the optical axis 15c of the light intensity equalizing element 15, optical loss further increases. For this reason, in the projection type display apparatus according to the first embodiment, the off-center amount dl of the central ray L10 of the first light flux L1 which is bended by the first bending mirror 13 with respect to the optical axis 15c of the light intensity equalizing element 15 and the off-center amount d2 of the central ray L20 of the second light flux L2 which is bended by the second bending mirror 14 with respect to the optical axis 15c of the light intensity equalizing element 15 are set to values more than 0.

Figure 5:
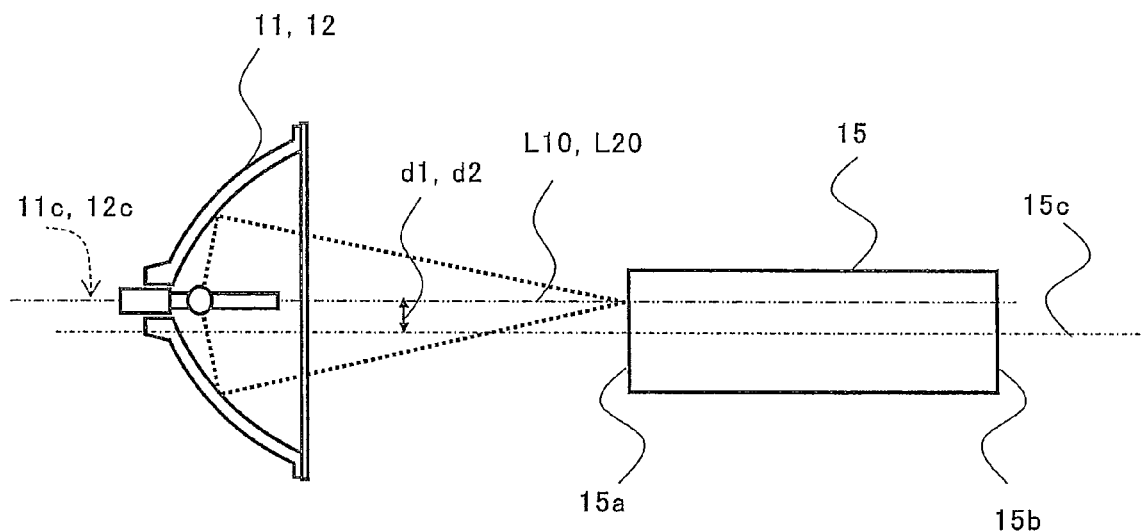
FIG. 5 is an explanatory diagram showing a structure for calculating a relationship between off-center amount of a central ray of a first light flux from a first light source lamp and off-center amount of a central ray of a second light flux from a second light source lamp, and light utilization efficiency.

FIG. 5 is an explanatory diagram showing a structure for calculating a relationship between the off-center amount d1 and d2 and light utilization efficiency. As shown in FIG. 5, if it is structured so that the central ray L10 of the first light flux from the first light source lamp 11 enters in a position of the off-center amount d1, for example, the first light flux L1 from the first light source lamp 11 is converged to a position at a distance of the off-center amount d1, at the incidence end 15a of the light intensity equalizing element 15, and thus the light utilization efficiency is lowered at the incidence end 15a of the light intensity equalizing element 15. Similarly, as shown in FIG. 5, if it is structured so that the central ray L20 of the second light flux from the second light source lamp 12 enters in a position of the off-center amount d2, for example, the second light flux L2 from the second light source lamp 12 is converged to a position at a distance of the off-center amount d2, at the incidence end 15a of the light intensity equalizing element 15, and thus the light utilization efficiency is lowered at the incidence end 15a of the light intensity equalizing element 15.

Figure 6:
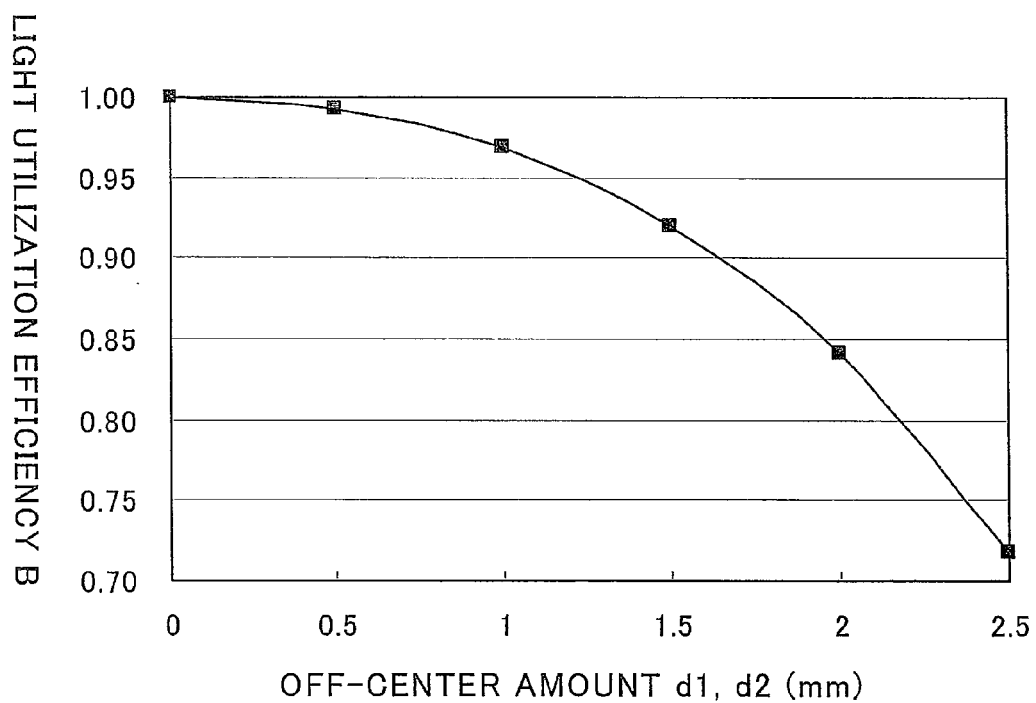
FIG. 6 is a diagram showing a result of a calculation of a relationship between off-center amount of the central ray of the first light flux from the first light source lamp and off-center amount of the central ray of the second light flux from the second light source lamp, and light utilization efficiency.

FIG. 6 is a diagram showing a result of a simulation calculation of a relationship between the off-center amount d1, d2 and light utilization efficiency B. The light utilization efficiency B in FIG. 6 is indicated as a ratio to light utilization efficiency when the off-center amount d1, d2 is 0, that is, when the central ray of the incident light flux to the light intensity equalizing element 15 agrees with the optical axis 15c of the light intensity equalizing element 15 as shown in FIG. 4. FIG. 6 indicates that the light utilization efficiency B equals to 1 when the off-center amount d1 is 0. If the off-center amount d1 is 0.5 mm, the light utilization efficiency B is 0.99. If the off-center amount dl increases as 1 mm, 1.5 mm and 2 mm, the light utilization efficiency B decreases as 0.97, 0.92 and 0.84. In the first embodiment, for example, both of the off-center amount d1 and d2 are set to 1.5 mm so that the light utilization efficiency B is high, i.e., 0.9 or more and so that the second light flux L2 from the second light source lamp 12 is hard to be blocked by the first bending mirror 14 (that is, so that an interference is reduced). The off-center amount d1 and d2 can be determined depending on various factors such as shapes, sizes and an arrangement of the elements, a light flux travelling direction, optical characteristics of the elements, and required performance.

Figure 7:
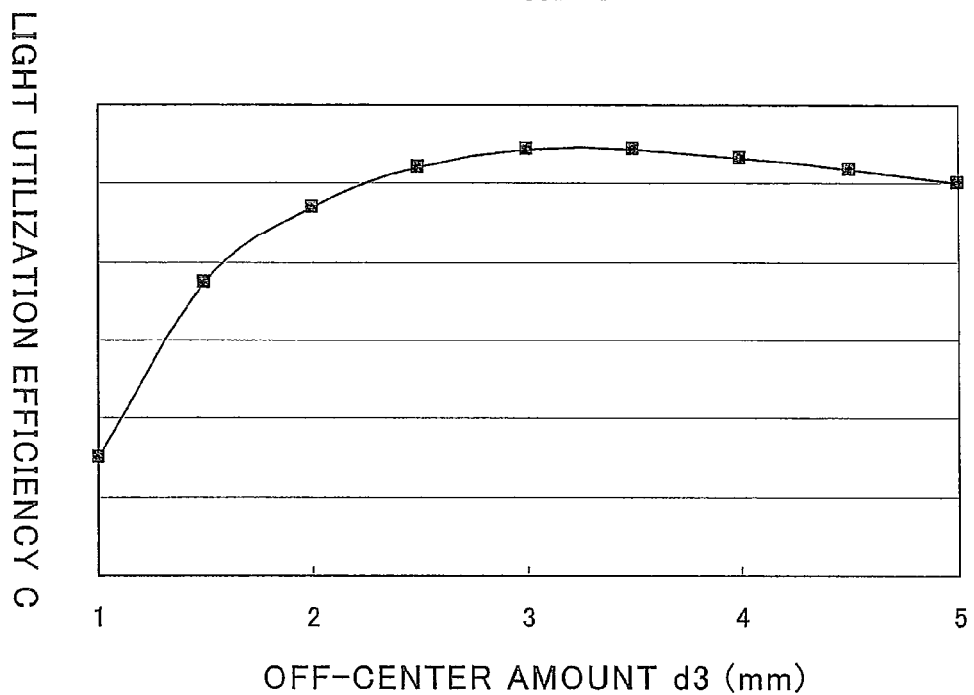
FIG. 7 is an explanatory diagram showing a structure for calculating a relationship between off-center amount between a first optical axis of the first light source lamp and a second optical axis of the second light source lamp, and light utilization efficiency.

FIG. 7 is a diagram showing a result of a simulation calculation of a relationship between off-center amount d3 and light utilization efficiency C. As shown in FIG. 4, in the first embodiment, the first optical axis 11c of the first light source lamp 11 is disposed closer to the light intensity equalizing element 15 in comparison with the second optical axis 12c of the second light source lamp 12. An end 13a of the first bending mirror 13 which is the end near the optical axis 15c of the light intensity equalizing element 15 is disposed closer to the first light source lamp 11 (an upper side of FIG. 4) in comparison with the optical axis 15c of the light intensity equalizing element 15, in order to avoid an inference with the second light flux L2 from the second light source lamp 12 as much as possible. FIG. 7 shows the result of the simulation calculation of the light utilization efficiency C when the off-center amount d1 in FIG. 4 is fixed to 1.5 mm and the off-center amount d3 varies. The light utilization efficiency C in FIG. 7, as well as the light utilization efficiency B in FIG. 6, is a ratio to light utilization efficiency when the off-center amount d1 is 0 in FIG. 5, that is, in a case that the central ray L10 of the first light flux L1 agrees with the optical axis 15c of the light intensity equalizing element 15. FIG. 7 shows a change in the light utilization efficiency C when the off-center amount d3 changes from 1 mm to 5 mm. It can be understood from FIG. 7 that if the off-center amount d3 is small, the first bending mirror 13 is small and thus the light utilization efficiency C is low; if the off-center amount d3 increases from 1 mm, the light utilization efficiency C gradually increases; and if the off-center amount d3 is 3 mm and 3.5 mm, the light utilization efficiency C is the highest.

Figure 8:
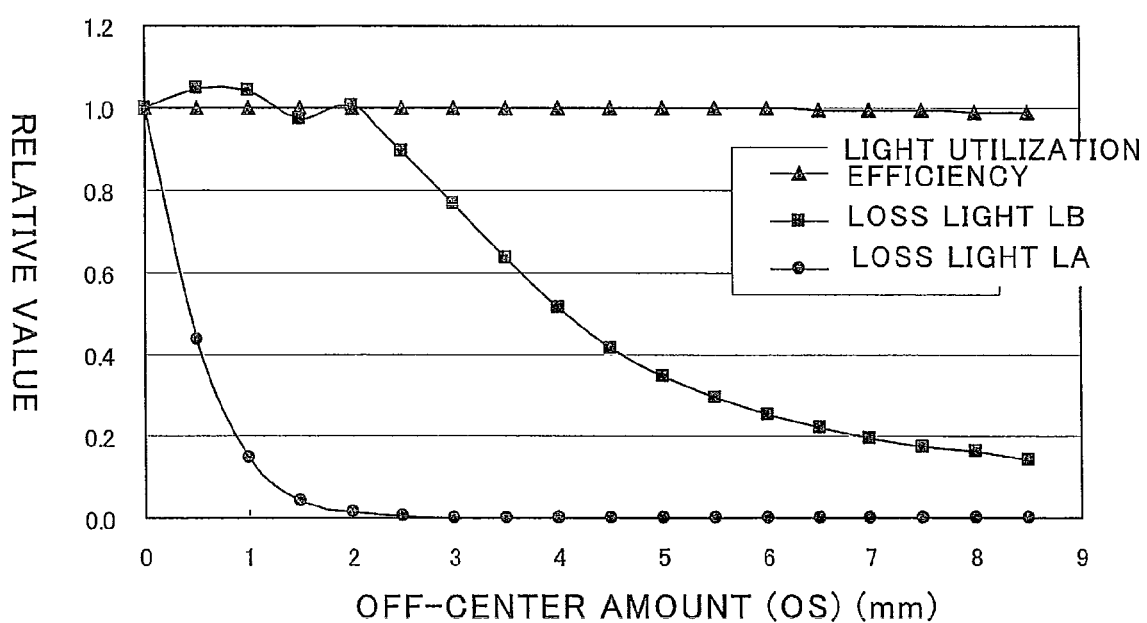
FIG. 8 is a diagram showing a relationship between offset amount and light utilization efficiency, and a relationship between offset amount and loss light.

FIG. 8 shows a relationship between offset amount OS and light utilization efficiency and a relationship between the offset amount OS and loss light. FIG. 8 shows a result of a calculation of the light utilization efficiency and the loss light in a case that the off-center amount d1 and d2 is fixed to 1.5 mm, the off-center amount d3 is fixed to 3.5 mm, and the offset amount OS between the first optical axis 11c of the first light source lamp 11 and the second optical axis 12c of the second light source lamp 12 changes from 0 mm to 8.5 mm, as a relative value to a case that the offset amount OS is 0 mm. The 'loss light' in FIG. 8 is a result of a simulation calculation of amount of light which reaches the illuminant 12a or 11a of the light source lamp 12 or 11 that is not lighted, when either one of the first light source lamp 11 or the second light source lamp 12 is lighted. In FIG. 8, if there is much loss light, one of the light source lamp causes a temperature of the other light source lamp to increase greatly and light emission efficiency and life may be damaged. If the loss light as stray light intrudes another section of the projection type display apparatus, it may cause a problem that quality of image is damaged, or the like. Thus, less loss light is desirable.

In respect to the offset amount OS between the first optical axis 11c of the first light source lamp 11 and the second optical axis 12c of the second light source lamp 12, if the offset amount OS shown in FIG. 4 increases, it is required to increase a size of the second bending mirror 14 for the second light source lamp 12. However, an end 14a of the second bending mirror 14 which is the end near the first light source lamp 11 can be extended closer to the first light source lamp 11 in comparison with the optical axis 15c of the light intensity equalizing element 15, and thus optical loss in the second bending mirror 14 does not increase even if the offset amount OS increases.

In FIG. 8, the light utilization efficiency is constant regardless of the change in the offset amount OS between the first optical axis 11c of the first light source lamp 11 and the second optical axis 12c of the second light source lamp 12. Thus, it is desirable to determine an optimum value of the offset amount OS according to amount of loss light. When only the second light source lamp 12 is lightened, if loss light which reaches the illuminant 11a of the first light source lamp 11 is denoted as 'LA', the loss light LA decreases in accordance with an increase in the offset amount OS. Similarly, when only the first light source lamp 11 is lightened, if loss light which reaches light source 12b of the second light source lamp 12 is denoted as 'LB', the loss light LB decreases in accordance with the increase in the offset amount OS. It can be understood from FIG. 8 that the loss light LA is approximately 0, if the offset OS equals to 2.5 mm or more. As shown in FIG. 8, by an arrangement that a predetermined value or more of the offset amount OS is maintained between the first optical axis 11c of the first light source lamp 11 and the second optical axis 12c of the second light source lamp 12, it is possible to keep high light utilization efficiency and to reduce loss light greatly. The optimum value of the offset amount OS is not limited to the example of FIG. 8 and can be determined depending on various factors such as shapes, sizes and an arrangement of the elements, a light flux travelling direction, optical characteristics of the elements, and required performance.

As described above, the projection type display apparatus according to the first embodiment has an arrangement that the first optical axis 11c of the first light source lamp 11 and the second optical axis 12c of the second light source lamp 12 disagree with each other, and thereby it is possible to keep high light utilization efficiency and to reduce loss light greatly.

Further, the projection type display apparatus according to the first embodiment has an arrangement that a light converging point of light from the first light source lamp 11 and light from the second light source lamp 12 is disposed near the incidence end 15a of the light intensity equalizing element 15, and thereby an optical system with high light utilization efficiency can be provided.

Furthermore, the projection type display apparatus according to the first embodiment has a structure that the first bending mirror 13 is disposed between the first light source lamp 11 and the light converging point F1 and the second bending mirror 14 is disposed between the second light source lamp 12 and the light converging point F2 in order to bend the first light flux L1 and the second light flux L2, and thereby an optical system with high light utilization efficiency and with loss light reduced can be provided.

Moreover, in the projection type display apparatus according to the first embodiment, if the light intensity equalizing element 15 is structured by a pipe-shaped element whose inner surfaces are light reflection surfaces, a holding structure of the light intensity equalizing element 15 can be easily designed and heat radiation performance can be improved.

Further, in the projection type display apparatus according to the first embodiment, if the light intensity equalizing element 15 is a pillar-shaped optical element structured with transparent material and having a polygonal cross section, the light intensity equalizing element 15 can be easily designed.

Moreover, in the projection type display apparatus according to the first embodiment, the elements are arranged so that the light converging points are positioned closer to the light intensity equalizing element 15 in comparison with the first bending mirror 13 and the second bending mirror 14, and thereby the bending mirrors can be prevented from heating. Thus, in the projection type display apparatus according to the first embodiment, it is not required to add a cooling device or the like, and thereby simplification of the structure and cost reduction of the apparatus can be realized.

Second Embodiment

Figure 9:
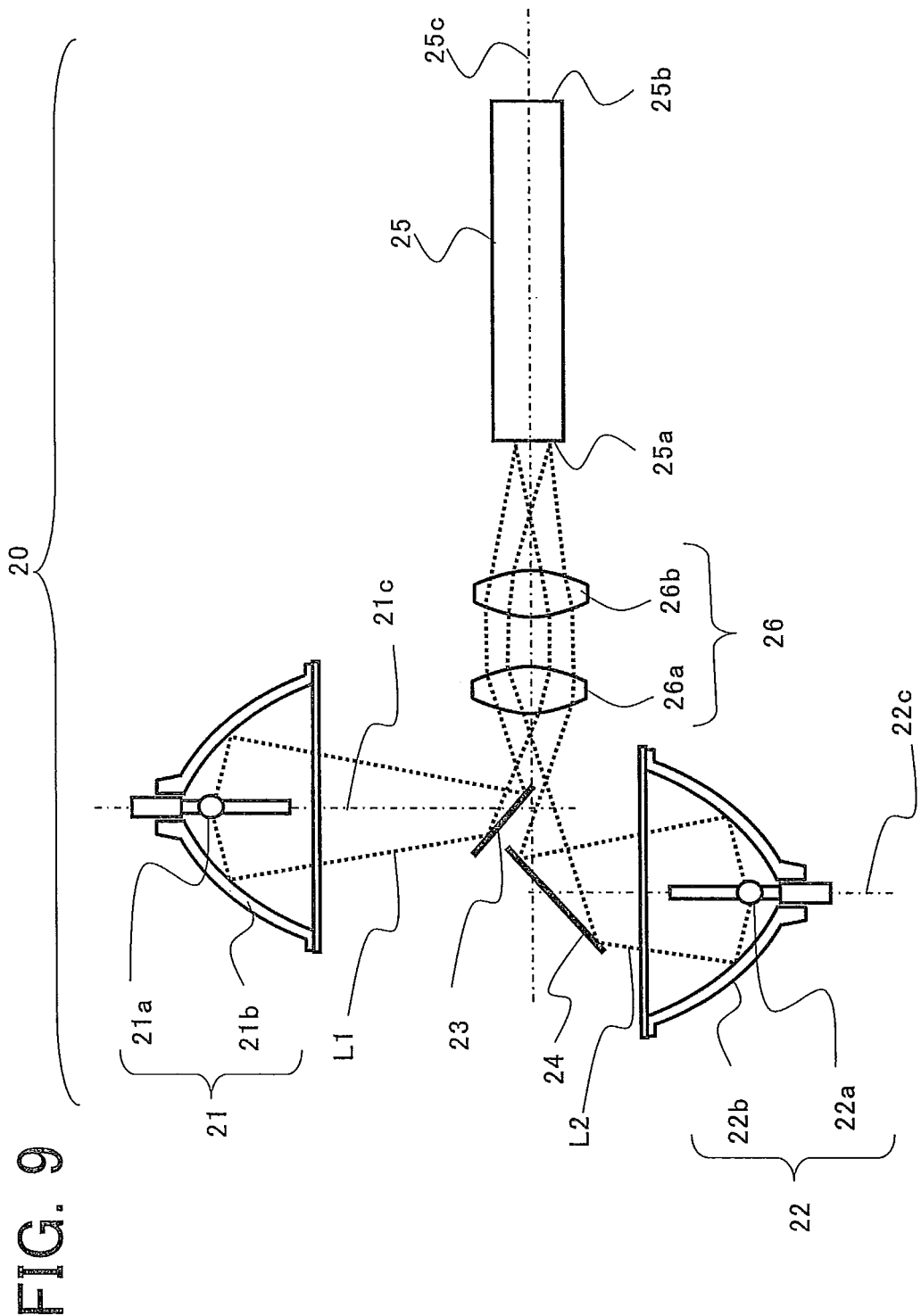
FIG. 9 is a diagram schematically showing a structure of a projection type display apparatus according to a second embodiment of the present invention.

FIG. 9 is a diagram schematically showing a light source device 20 in a projection type display apparatus according to a second embodiment. The light source device 20 shown in FIG. 9 can be used as a light source device in the projection type display apparatus shown in FIG. 1 (the first embodiment). A first light source lamp 21, a second light source lamp 22, a first bending mirror 23, a second bending mirror 24 and a light intensity equalizing element 25 in FIG. 9 are similar in structure to the first light source lamp 11, the second light source lamp 12, the first bending mirror 13, the second bending mirror 14 and the light intensity equalizing element 15 in FIG. 1, respectively. Illuminants 21a and 22a, ellipsoidal mirrors 21b and 22b, optical axes 21c and 22c, an incidence end 25a, an exit end 25b and an optical axis 25c in FIG. 9 are similar in structure to the illuminants 11a and 12a, the ellipsoidal mirrors 11b and 12b, the optical axes 11c and 12c, the incidence end 15a, the exit end 15b and the optical axis 15c in FIG. 1, respectively. The projection type display apparatus according to the second embodiment differs from the projection type display apparatus according to the first embodiment, in a point to include a relay optical system 26 guiding a first light flux L1 which is bended by the first bending mirror 23 and a second light flux L2 which is bended by the second bending mirror 24 to the light intensity equalizing element 25. As shown in FIG. 9, in the second embodiment, the relay optical system 26 which includes a lens 26a and a lens 26b guides a light flux to the light intensity equalizing element 25. By including the relay optical system 26, distribution of the incident light flux at the incidence end 25a of the light intensity equalizing element 25 can be converted to desirable distribution.

Except for the points described above, the second embodiment is the same as the first embodiment.

Third Embodiment

Figure 10:
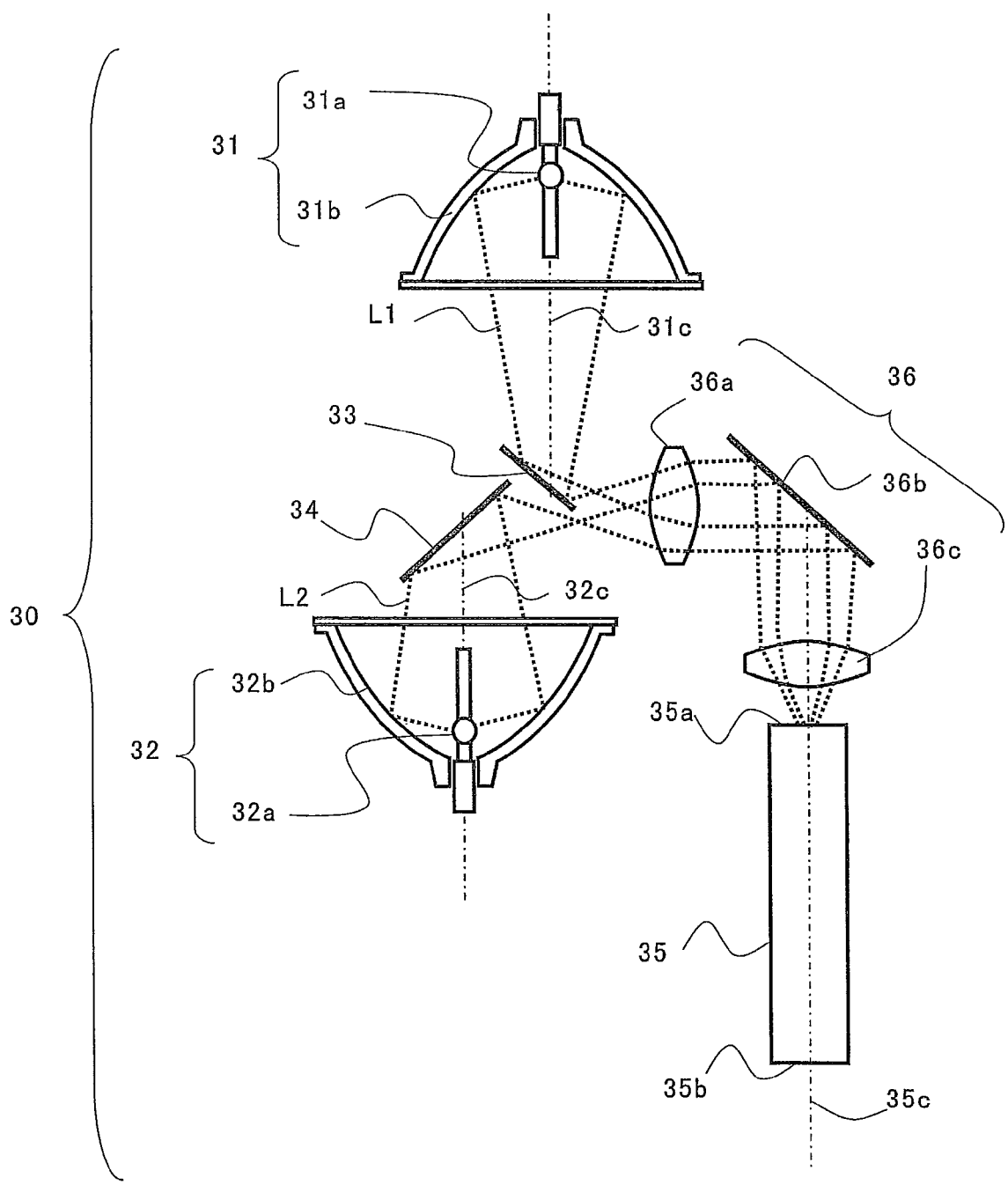
FIG. 10 is a diagram schematically showing a structure of a projection type display apparatus according to a third embodiment of the present invention.

FIG. 10 is a diagram schematically showing a structure of a light source device 30 in the projection type display apparatus according to the third embodiment of the present invention. The light source device 30 shown in FIG. 10 can be used as a light source device for the projection type display apparatus shown in FIG. 1 (the first embodiment). A first light source lamp 31, a second light source lamp 32, a first bending mirror 33, a second bending mirror 34 and a light intensity equalizing element 35 in FIG. 10 are similar in structure to the first light source lamp 11, the second light source lamp 12, the first bending mirror 13, the second bending mirror 14 and the light intensity equalizing element 15 in FIG. 1, respectively. Illuminants 31a and 32a, ellipsoidal mirrors 31b and 32b, optical axes 31c and 32c, an incidence end 35a, an exit end 35b and an optical axis 35c in FIG. 10 are similar in structure to the illuminants 11a and 12a, the ellipsoidal mirrors 11b and 12b, the optical axes 11c and 12c, the incidence end 15a, the exit end 15b and the optical axis 15c in FIG. 1, respectively. The projection type display apparatus according to the third embodiment differs from the projection type display apparatus according to the first embodiment, in a point that a relay optical system 36 guiding a first light flux L1 which is bended by the first bending mirror 33 and a second light flux L2 which is bended by a second bending mirror 34 to the light intensity equalizing element 35 are provided. As shown in FIG. 10, in the third embodiment, the relay optical system 36 includes a lens 36a, a bending mirror 36b and a lens 36c and guides a light flux to the light intensity equalizing element 35. By disposing the relay optical system 36, distribution of the incident light flux at the incidence end 35a of the light intensity equalizing element 35 can be converted to desirable distribution. Furthermore, the relay optical system 36 includes the bending mirror 36b as shown in FIG. 10, and thereby flexibility in an arrangement of the elements in the projection type display apparatus can be improved (that is, a flexible layout can be realized).

Except for the points described above, the third embodiment is the same as the first or second embodiment.

Fourth Embodiment

Figure 11:
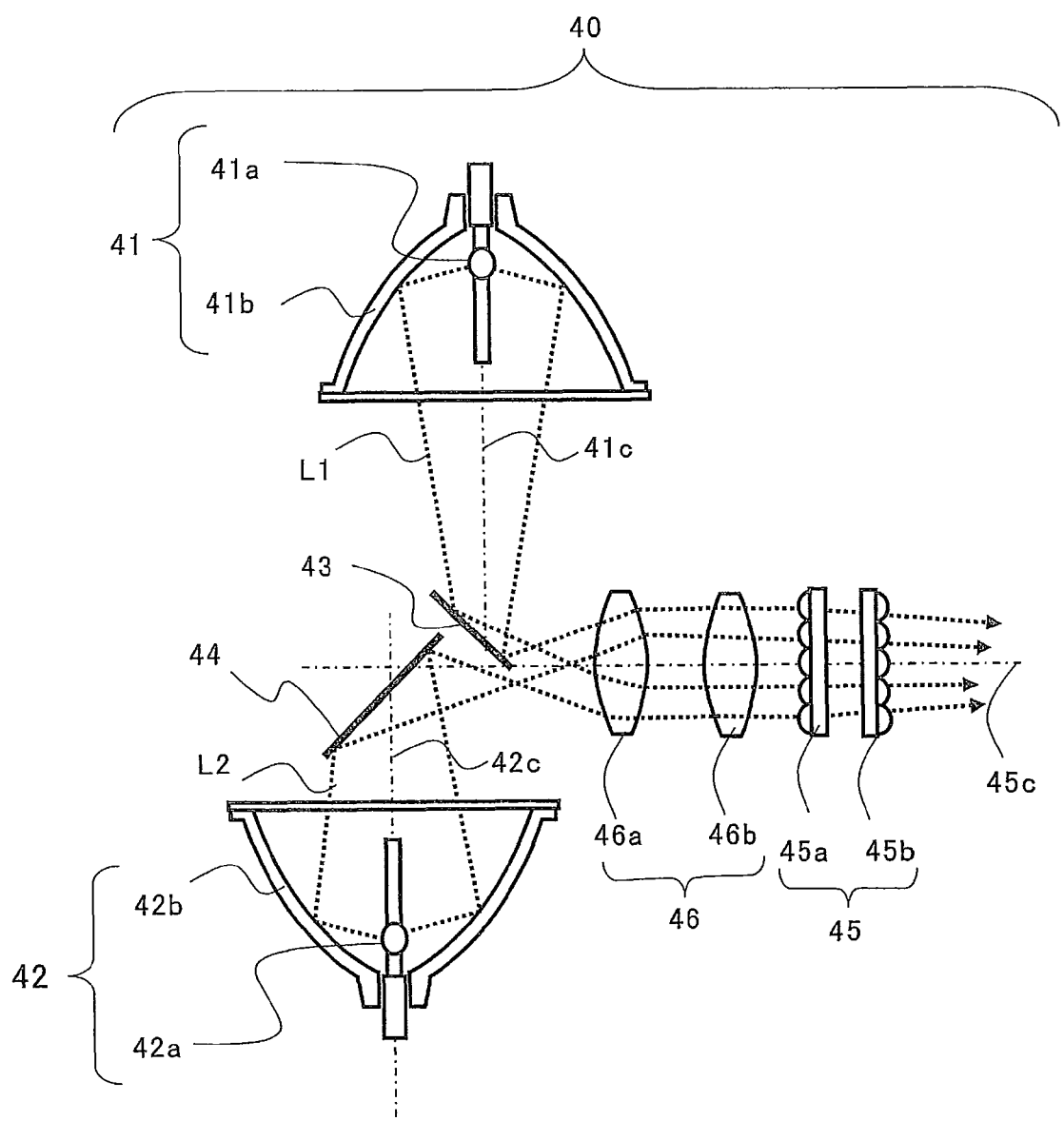
FIG. 11 is a diagram schematically showing a structure of a projection type display apparatus according to a fourth embodiment of the present invention.

FIG. 11 is a diagram schematically showing a structure of a light source device 40 in a projection type display apparatus according to a fourth embodiment of the present invention. The light source device 40 shown in FIG. 11 can be used as a light source device for the projection type display apparatus shown in FIG. 1 (the first embodiment). A first light source lamp 41, a second light source lamp 42, a first bending mirror 43, a second bending mirror 44 and a relay optical system 46 in FIG. 11 are similar in structure to the first light source lamp 21, the second light source lamp 22, the first bending mirror 23, the second bending mirror 24 and the relay optical system 26 in FIG. 9 (the second embodiment), respectively. Illuminants 41a and 42a, ellipsoidal mirrors 41b and 42b, and optical axes 41c and 42c in FIG. 11 are similar in structure to the illuminants 21a and 22a, the ellipsoidal mirrors 21b and 22b, and the optical axes 21c and 22c in FIG. 9. The projection type display apparatus according to the fourth embodiment differs from the projection type display apparatus according to the second embodiment, in a structure of a light intensity equalizing element 45. As shown in FIG. 11, in the fourth embodiment, the light intensity equalizing element 45 has a structure that lens arrays 45a and 45b which include a plurality of two-dimensionally arranged lens elements are placed in a line in a direction of an optical axis 45c. The light intensity equalizing element 45 having such structure makes it possible to equalize intensity distribution in a cross section of an illumination light flux and to prevent illumination irregularities. Furthermore, the projection type display apparatus according to the fourth embodiment can be reduced in size in a direction of the optical axis 45c, in comparison with the case that the light intensity equalizing element is structured by a rod which is an optical element.

Except for the points described above, the fourth embodiment is the same as the first, second or third embodiment.

Fifth Embodiment

Figure 12:
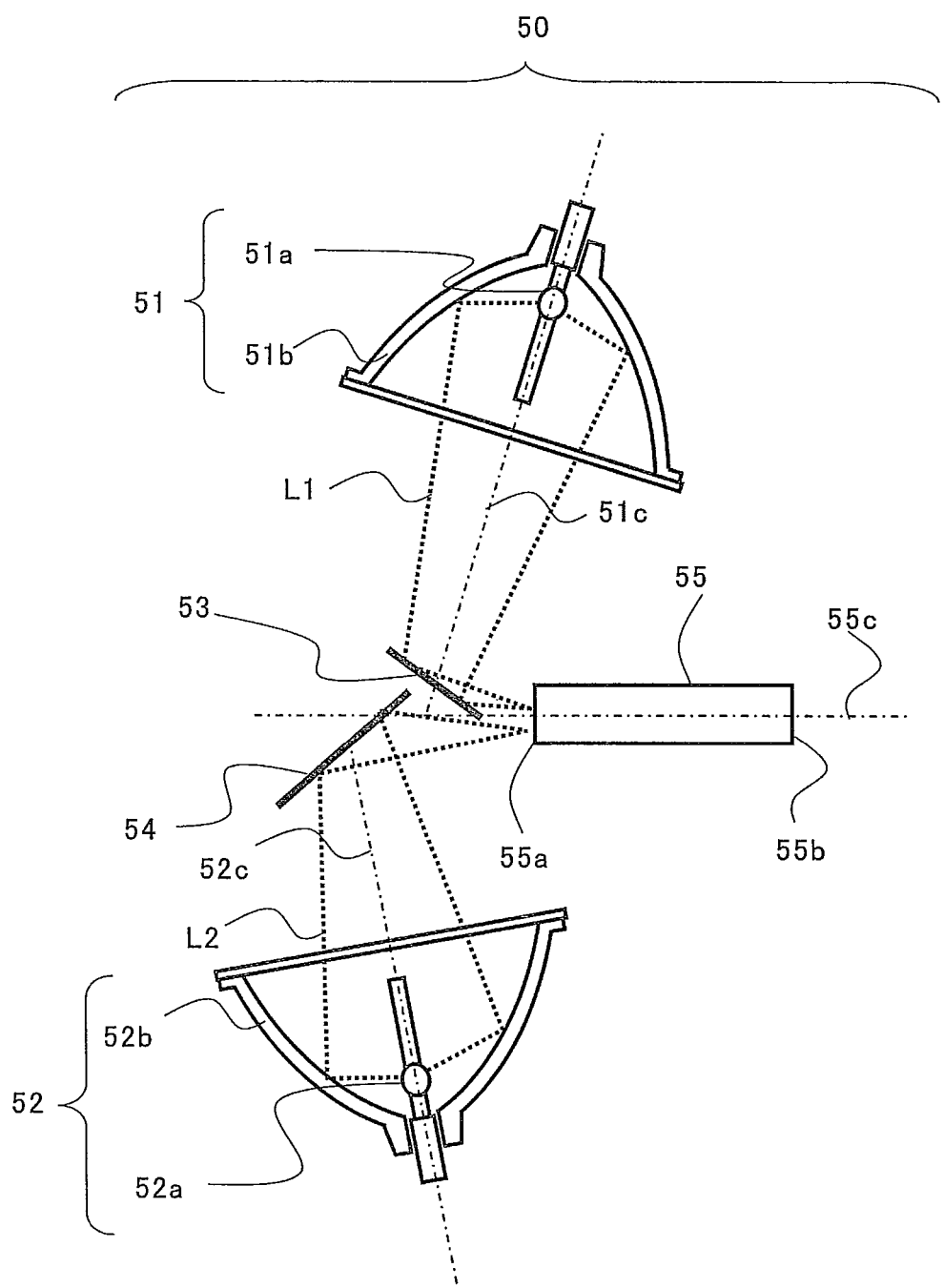
FIG. 12 is a diagram schematically showing a structure of a projection type display apparatus according to a fifth embodiment of the present invention.

FIG. 12 is a diagram schematically showing a structure of a light source device 50 in the projection type display apparatus according to a fifth embodiment of the present invention. The light source device 50 shown in FIG. 12 can be used as a light source device for the projection type display apparatus shown in FIG. 1 (the first embodiment). A first light source lamp 51, a second light source lamp 52, a first bending mirror 53, a second bending mirror 54 and a light intensity equalizing element 55 in FIG. 12 are similar in structure to the first light source lamp 11, the second light source lamp 12, the first bending mirror 13, the second bending mirror 14 and the light intensity equalizing element 15 in FIG. 1, respectively. Illuminants 51a and 52a, ellipsoidal mirrors 51b and 52b, optical axes 51c and 52c, an incidence end 55a, an exit end 55b and an optical axis 55c in FIG. 12 are similar in structure to the illuminants 11a and 12a, the ellipsoidal mirrors 11b and 12b, the optical axes 11c and 12c, the incidence end 15a, the exit end 15b and the optical axis 15c in FIG. 1, respectively. The projection type display apparatus according to the fifth embodiment differs from the projection type display apparatus according to the first embodiment, in a point that the first light source lamp 51, the second light source lamp 52, the first bending mirror 53, the second bending mirror 54 and the light intensity equalizing element 55 are arranged so that an angle between the first optical axis 51c and the optical axis 55c of the light intensity equalizing element 55 is less than 90 degrees and an angle between the second optical axis 52c and the optical axis 55c of the light intensity equalizing element 55 is less than 90 degrees. According to the structure of the fifth embodiment, a size of the light source device 50 in a vertical direction in FIG. 12 can be reduced.

Furthermore, the first light source lamp 51, the second light source lamp 52, the first bending mirror 53, the second bending mirror 54 and the light intensity equalizing element 55 can be arranged so that an angle between the first optical axis 51c and the optical axis 55c of the light intensity equalizing element 55 is more than 90 degrees and an angle between the second optical axis 52c and the optical axis 55c of the light intensity equalizing element 55 is more than 90 degrees.

Except for the points described above, the fifth embodiment is the same as the first, second, third or fourth embodiment.

Sixth Embodiment

Figure 13:
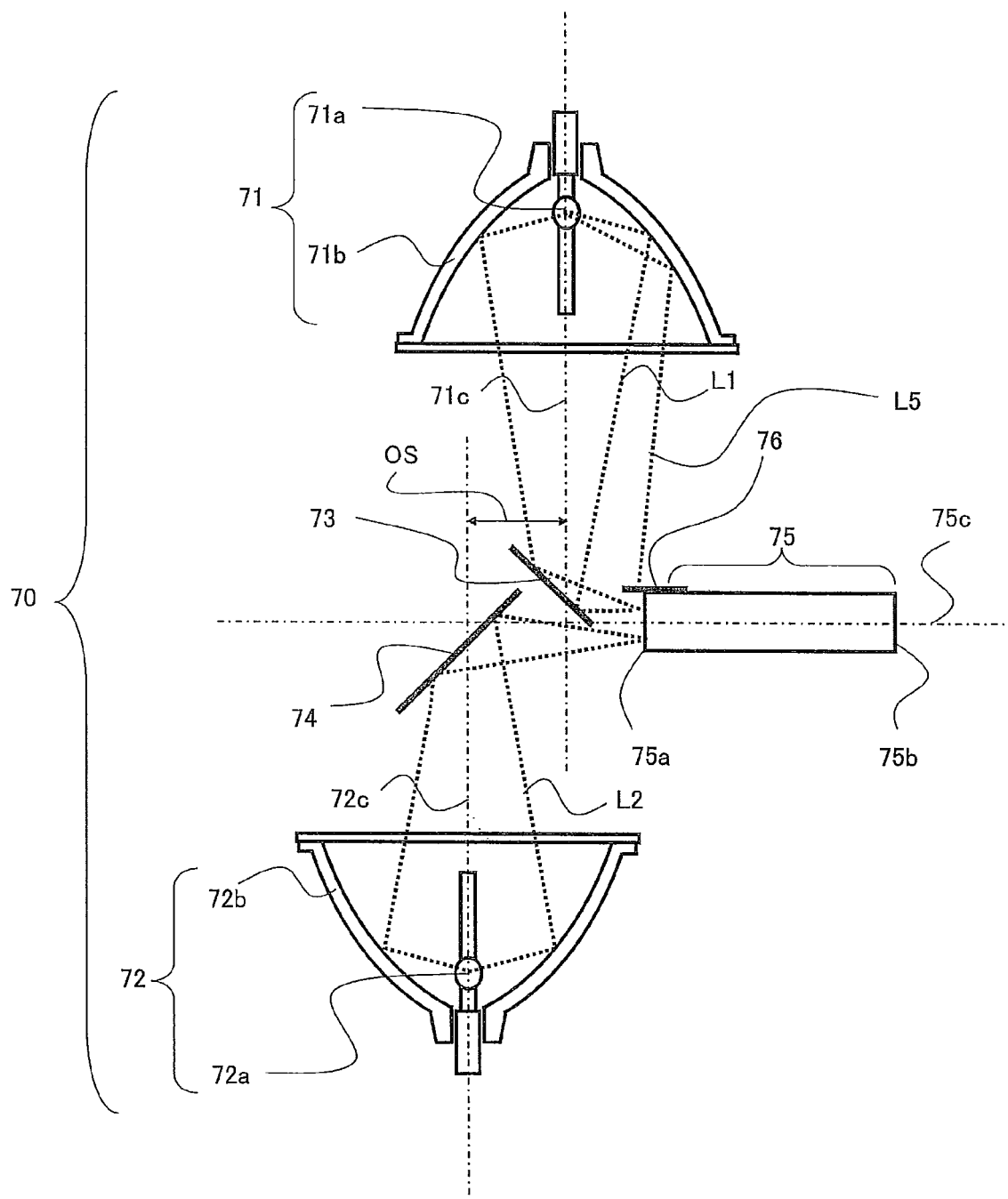
FIG. 13 is a diagram schematically showing a structure of a projection type display apparatus according to a sixth embodiment of the present invention.

FIG. 13 is a diagram schematically showing a structure of a light source device 70 in the projection type display apparatus according to a sixth embodiment of the present invention. The light source device 70 shown in FIG. 13 can be used as a light source device for the projection type display apparatus in FIG. 1 (the first embodiment). A first light source lamp 71, a second light source lamp 72, a first bending mirror 73, a second bending mirror 74 and a light intensity equalizing element 75 in FIG. 13 are similar in structure to the first light source lamp 11, the second light source lamp 12, the first bending mirror 13, the second bending mirror 14 and the light intensity equalizing element 15 in FIG. 1, respectively. Illuminants 71a and 72a, ellipsoidal mirrors 71b and 72b, optical axes 71c and 72c, an incidence end 75a, an exit end 75b and an optical axis 75c in FIG. 13 are similar in structure to the illuminants 11a and 12a, the ellipsoidal mirrors 11b and 12b, the optical axes 11c and 12c, the incidence end 15a, the exit end 15b and the optical axis 15c in FIG. 1, respectively.

The projection type display apparatus according to the sixth embodiment differs from the projection type display apparatus according to the first embodiment, in a point to include a light blocking plate 76 neighboring the incidence end 75a of the light intensity equalizing element 75 and blocking (reflecting or absorbing) a light flux which is emitted from the first light source lamp 71 and travels toward the second light source lamp 72 (the illuminant 72a and an inner surface of the ellipsoidal mirror 72b (reflection surface), particularly). Furthermore, the light blocking plate 76 also has a function of blocking (reflecting or absorbing) a light flux which is emitted from the second light source lamp 72 and travels toward the first light source lamp 71 (the illuminant 71a and an inner surface of the ellipsoidal mirror 71b (reflection surface), particularly). Any material is available for the light blocking plate 76, if it is a material which does not transmit light.

The light blocking plate 76 is disposed, as shown in FIG. 13, neighboring the incidence end 75a of the light intensity equalizing element 75 on the side of the first light source lamp 71. However, the light blocking plate 76 can be disposed neighboring the incidence end 75a of the light intensity equalizing element 75 on the side of the second light source lamp 72. Further, it is desirable that the light blocking plate 76 be positioned so as not to block a light flux L1 travelling from the first light source lamp 71 toward the first bending mirror 73 and so as not to block a light flux L2 travelling from the second light source lamp 72 toward the second bending mirror 74. Furthermore, it is desirable that the light blocking plate 76 should have a position, a size (a length and a width), and a shape so as to block a light flux travelling from the first light source lamp 71 toward the second light source lamp 72 (or a light flux travelling from the second light source lamp 72 toward the first light source lamp 71) as much as possible.

As shown in FIG. 13, in the sixth embodiment, loss light L5 which does not reach the first bending mirror 73 out of the light flux from the first light source lamp 71 and loss light out of the light flux from the second light source lamp 72 can be blocked by the light blocking plate 76. Thus, the loss light traveling from the first light source lamp 71 toward the second light source lamp 72 and the loss light traveling from the second light source lamp 72 toward the first light source lamp 71 decrease, influence of the loss light on the first light source lamp 71 and the second light source lamp 72 decreases, and thereby there is an effect that lives of the first light source lamp 71 and the second light source lamp 721 can be made longer.

FIG. 14 is a diagram showing a result of confirming the effect in the case that the light blocking plate 76 is actually disposed. FIG. 14 shows light utilization efficiency when a length E1 of the light blocking plate 76 varies from 0.1 mm to 0.6 mm by 0.1 mm, and amount of loss light LB (relative value) which reaches the light source 72a of the second light source lamp 72 when only the first light source lamp 71 is lighted. It can be understood that if the length E1 of the light blocking plate 76 is made large, the loss light LB can be greatly reduced, although the light utilization efficiency slightly decreases.

Except for the points described above, the sixth embodiment is the same as the first embodiment.

Explanation of Reference Numerals and Symbols 10, 20, 30, 40, 50, 70 light source device; 11, 21, 31, 41, 51, 71 first light source lamp; 11a, 21a, 31a, 41a, 51a, 71a illuminant; 11b, 21b, 31b, 41b, 51b, 71b ellipsoidal mirror; 11c, 21c, 31c, 41c, 51c, 71c optical axis of first light source lamp; 12, 22, 32, 42, 52, 72 second light source lamp; 12a, 22a, 32a, 42a, 52a, 72a illuminant; 12b, 22b, 32b, 42b, 52b, 72b ellipsoidal mirror; 12c, 22c, 32c, 42c, 52c, 72c optical axis of second light source lamp; 13, 23, 33, 43, 53, 73 first bending mirror; 14, 24, 34, 44, 54, 74 second bending mirror; 15, 25, 35, 45, 55, 75 light intensity equalizing element; 15a, 25a, 35a, 45a, 55a, 75a incidence end of light intensity equalizing element; 15b, 25b, 35b, 45b, 55b, 75b exit end of light intensity equalizing element; 15c, 25c, 35c, 45c, 55c, 75c optical axis of light intensity equalizing element; 26, 36, 46, relay optical system; 61 image display element; 62 projection optical system; 63 screen; 76 light blocking plate; L1 first light flux; L2 second light flux; L3 light emitted from light intensity equalizing element; L4 image light; L5 first loss light; L10 central ray; L20 central ray; F1 first light converging point; F2 second light converging point.

What is claimed is:

1. A projection type display apparatus comprising:
a first light source unit emitting a first light flux;
a second light source unit emitting a second light flux, the first light source unit and the second light source unit being arranged so that an optical axis of the first light flux when the first light flux is emitted from the first light unit is offset from an optical axis of the second light flux when the second light flux is emitted from the second light unit, a position of the first light source unit, from the first light flux is emitted, approximately confronting a position of the second light source unit, from the second light flux is emitted;
a light intensity equalizing unit including an incidence end and an exit end and converting a light flux incident to the incidence end into a light flux with an equalized intensity distribution, which is emitted from the exit end;
a first bending unit directing the first light flux emitted from the first light source unit toward the incidence end;
a second bending unit directing the second light flux emitted from the second light source unit toward the incidence end;
an image display element modulating the light flux emitted from the exit end of the light intensity equalizing unit to convert the light flux into image light; and
a projection optical system projecting the image light on a screen;
wherein the first light source unit, the second light source unit, the first bending unit and the second bending unit are arranged so that a first optical axis of the first light source unit is offset in a direction parallel to an optical axis of the light intensity equalizing unit from a second optical axis of the second light source unit, and a first distance between the first bending unit and the incidence end is shorter in the direction parallel to the optical axis of the light intensity equalizing unit than a second distance between the second bending unit and the incidence end,
wherein a first end of the first bending unit on a side of the second light source unit is positioned on a side of the first light source from the optical axis of the light intensity equalizing unit, and a second end of the second bending unit on a side of the first light source unit is positioned on a side of the first light sources across the optical axis of the light intensity equalizing unit.

2. The projection type display apparatus according to claim 1, wherein
the first light flux emitted from the first light source unit and the second light flux emitted from the second light source unit are converging light fluxes, and
the first light source unit, the second light source unit, the first bending unit, the second bending unit and the light intensity equalizing unit are arranged so that a first light converging point of the first light flux is positioned closer to the light intensity equalizing unit than the first bending unit and a second light converging point of the second light flux is positioned closer to the light intensity equalizing unit than the second bending unit.

3. The projection type display apparatus according to claim 1, wherein a first incidence position where a central ray of the first light flux enters the incidence end and a second incidence position where a central ray of the second light flux enters the incidence end are different from each other and are apart from the optical axis of the light intensity equalizing unit.

4. The projection type display apparatus according to claim 1, comprising a light blocking unit neighboring the incidence end and blocking light which is emitted from the first light source unit and travels toward the second light source unit and light which is emitted from the second light source unit and travels toward the first light source unit.

5. The projection type display apparatus according to claim 1, comprising a relay optical system guiding the first light flux bended by the first bending unit and the second light flux bended by the second bending unit, to the light intensity equalizing unit.

6. The projection type display apparatus according to claim 1, wherein the light intensity equalizing unit includes a pipe-shaped element including light reflection surfaces as inner surfaces.

7. The projection type display apparatus according to claim 1, wherein the light intensity equalizing unit includes a polygonal element made from transparent material.

8. The projection type display apparatus according to claim 1, wherein the light intensity equalizing unit includes a lens array including a plurality of two-dimensionally arranged lens elements.

9. The projection type display apparatus according to claim 1, wherein the first light source unit, the second light source unit, the first bending unit, the second bending unit and the light intensity equalizing unit are arranged so that an angle between the first optical axis of the first light source unit and the optical axis of the light intensity equalizing unit is 90 degrees and an angle between the second optical axis of the second light source unit and the optical axis of the light intensity equalizing unit is 90 degrees.

10. The projection type display apparatus according to claim 1, wherein the first light source unit, the second light source unit, the first bending unit, the second bending unit and the light intensity equalizing unit are arranged so that an angle between the first optical axis of the first light source unit and the optical axis of the light intensity equalizing unit is less than 90 degrees and an angle between the second optical axis of the second light source unit and the optical axis of the light intensity equalizing unit is less than 90 degrees.

* * * * *